March 8, 1960

G. S. ORMSBY

ROTARY SEAL 2,927,774

Filed May 10, 1957

INVENTOR.
G. S. ORMSBY

BY Hudson and Young

ATTORNEYS

March 8, 1960  G. S. ORMSBY  2,927,774
ROTARY SEAL

Filed May 10, 1957  7 Sheets-Sheet 2

FIG. 2

INVENTOR.
G. S. ORMSBY
BY Hudson and Young

ATTORNEYS

FIG. 3

March 8, 1960   G. S. ORMSBY   2,927,774
ROTARY SEAL

Filed May 10, 1957   7 Sheets-Sheet 4

INVENTOR.
G.S. ORMSBY
BY
Hudson and Young
ATTORNEYS

March 8, 1960 G. S. ORMSBY 2,927,774
ROTARY SEAL
Filed May 10, 1957 7 Sheets-Sheet 5

INVENTOR.
G. S. ORMSBY
BY Hudson and Young
ATTORNEYS

March 8, 1960

G. S. ORMSBY 2,927,774

ROTARY SEAL

Filed May 10, 1957

INVENTOR.
G.S. ORMSBY

BY Hudson and Young

ATTORNEYS

March 8, 1960

G. S. ORMSBY 2,927,774

ROTARY SEAL

Filed May 10, 1957

INVENTOR.
G.S. ORMSBY

BY

ATTORNEYS.

United States Patent Office 2,927,774
Patented Mar. 8, 1960

2,927,774

ROTARY SEAL

George S. Ormsby, The Hague, Netherlands, assignor to Phillips Petroleum Company, a corporation of Delaware Application May 10, 1957, Serial No. 658,327

22 Claims. (Cl. 255—23)

This invention relates to a rotary seal. In one aspect this invention relates to a rotary seal adapted to be utilized with rotary well drilling apparatus. In another aspect this invention relates to a rotary seal wherein provision is made to accommodate eccentricity or wobble in the rotation of the kelly.

In drilling wells for oil and gas, it is sometimes desirable to lighten the column of drilling fluid to prevent lost circulation, to increase the drilling rate, and/or to allow small amounts of oil and gas from the formation being drilled to enter the drilling fluid in order that it may be detected. Said lightening of the drilling fluid can be done by injecting a gas (generally air but sometimes hydrocarbon gas or combustion gases) into the liquid used as the drilling fluid before it is pumped into the well. This technique is commonly referred to as "aerated mud drilling." Thus, while the use of aerated mud has been found to have a number of advantages in rotary drilling operations, one of the difficulties encountered when aerated mud is used is that it is necessary to provide some form of rotary seal at the top of the drill string in order to prevent mud overflow from the top of the mud return line. Although rotary seals are presently available commercially, those presently available are designed for high pressure installations and consequently are bulky, heavy, and inconvenient to install and remove. The rotary seal of the present invention is designed for use at relatively low pressures and is compact, light, and easy to install and remove. Thus the rotary seal of the invention fills a long existing need in the art of rotary drilling.

Broadly speaking, the invention provides an improved rotary seal which comprises an upper rotating seal adapted to form a seal with a kelly, a lower non-rotating seal adapted to be connected to a well head structure, and a sleeve, adapted to rotate with said upper rotating seal, extending between said upper rotating seal and said lower non-rotating seal. Said lower non-rotating seal is adapted to accommodate eccentricity and/or wobble in the rotation of a kelly.

An object of this invention is to provide an improved rotary seal. Another object of this invention is to provide an improved rotary seal, which is compact, light, and easy to install and remove. Another object of this invention is to provide a rotary seal which is especially adapted to be employed during drilling operations employing aerated mud. Another object of this invention is to provide an improved rotary seal which is effective in preventing overflow of mud from the top of the mud return line. Another object of this invention is to provide a rotary seal which is capable of accommodating eccentricity and/or wobble of the kelly during rotation, and misalignment of the derrick and/or supporting casing. Still another object of this invention is to prevent abnormal stresses on the entire well head equipment including the kelly drive bushing, rotary table, mud return line, blowout preventer, casing head, etc. and thus reduce undue wear and fatigue of said equipment. Other objects, aspects, and advantages of the invention will be apparent to those skilled in the art in view of this disclosure.

Thus, according to the invention there is provided, in rotary well drilling apparatus, an improved rotary seal comprising, in combination: an upper rotatable sealing means adapted to form a sealed contact with a kelly; a lower non-rotatable sealing means comprising, a generally tubular body structure having a lower body section adapted to be connected to a well casing head structure, and an upper body section in sealed laterally movable contact with said lower body section; and a sleeve extending between said upper rotatable sealing means and said lower non-rotatable sealing means.

It is to be noted that the upper seal of my improved rotary seal forms a sealed contact with the kelly and rotates therewith. It is to be particularly noted that in the non-rotating lower seal the upper body section or portion thereof is adapted for lateral movement relative to the lower body section or portion thereof. It should also be noted that the sleeve which extends from the upper rotating seal to the lower non-rotating seal is, in all embodiments of the invention as described more fully hereinafter, firmly attached to and rotates with said upper rotating seal. My improved rotary seal thus provides a firm positive seal at the upper end of the well head structure which seal, due to the lateral movement provided in the lower non-rotating sealing means, can accommodate eccentricity and/or wobble of the kelly, and misalignment of the derrick and/or supporting casing.

Figure 10 thus shows a cross-section of the unit as it appears when installed with base 43 bolted to the upper flange of mud return line 13 (see Figure 1).

Figure 1:
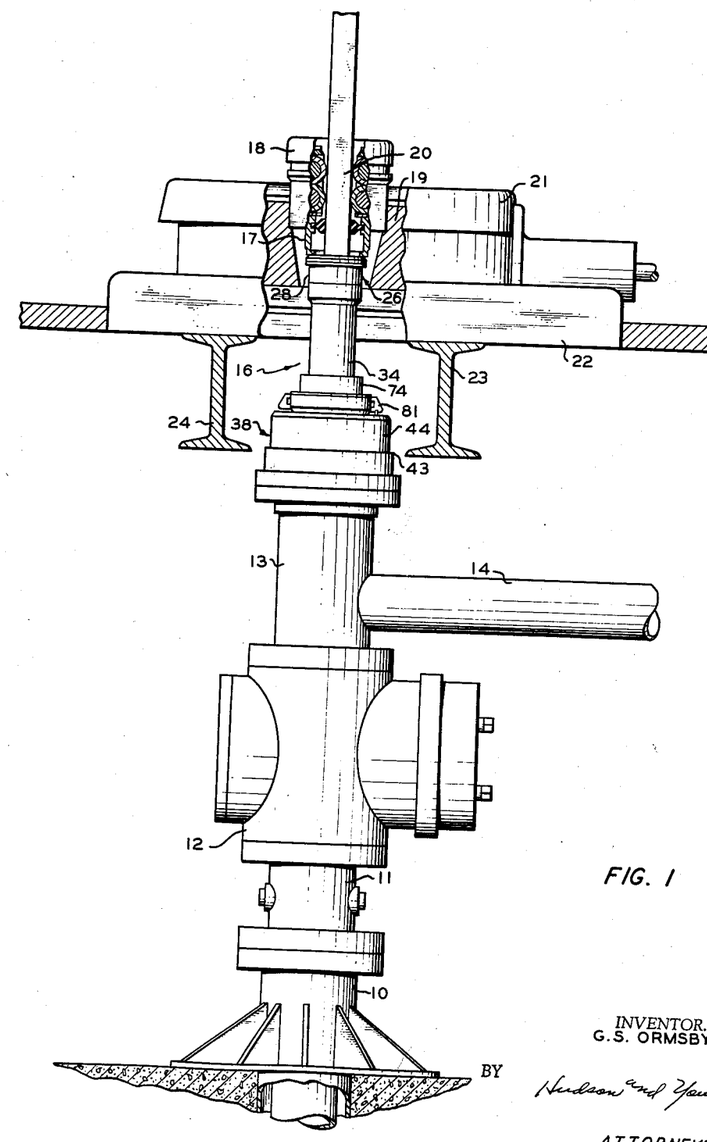
Figure 1 is an elevation, partially in section, of a typical well head control equipment, and illustrating an improved rotary seal of the invention installed.

Referring now to the drawings, the invention will be more fully explained. In all of said drawings, like reference numerals are employed to denote like elements. In Figure 1, there is shown a typical well casing head 10 having connected thereto an adapter spool 11. The usual blowout preventers 12 are connected to said adapter spool. Mud return line 13 is connected to the top of blowout preventers 12 and is provided with a side outlet 14 which carries the returning drilling fluid to the separator and shale shaker (not shown). The improved rotary seal of the invention, designated generally as 16, is connected to the top of mud return line 13 and to skirt 17 of kelly drive bushing 18. Kelly 20 extends through said kelly drive bushing 18 as will be understood by those skilled in the art. Said kelly drive bushing 18 is supported in master bushing 19 in driving means 21 which in turn is supported by rotary table 22. Said rotary table 22 is in turn supported by I-beams 23 and 24 which are supported by the substructure (not shown).

Figure 2:
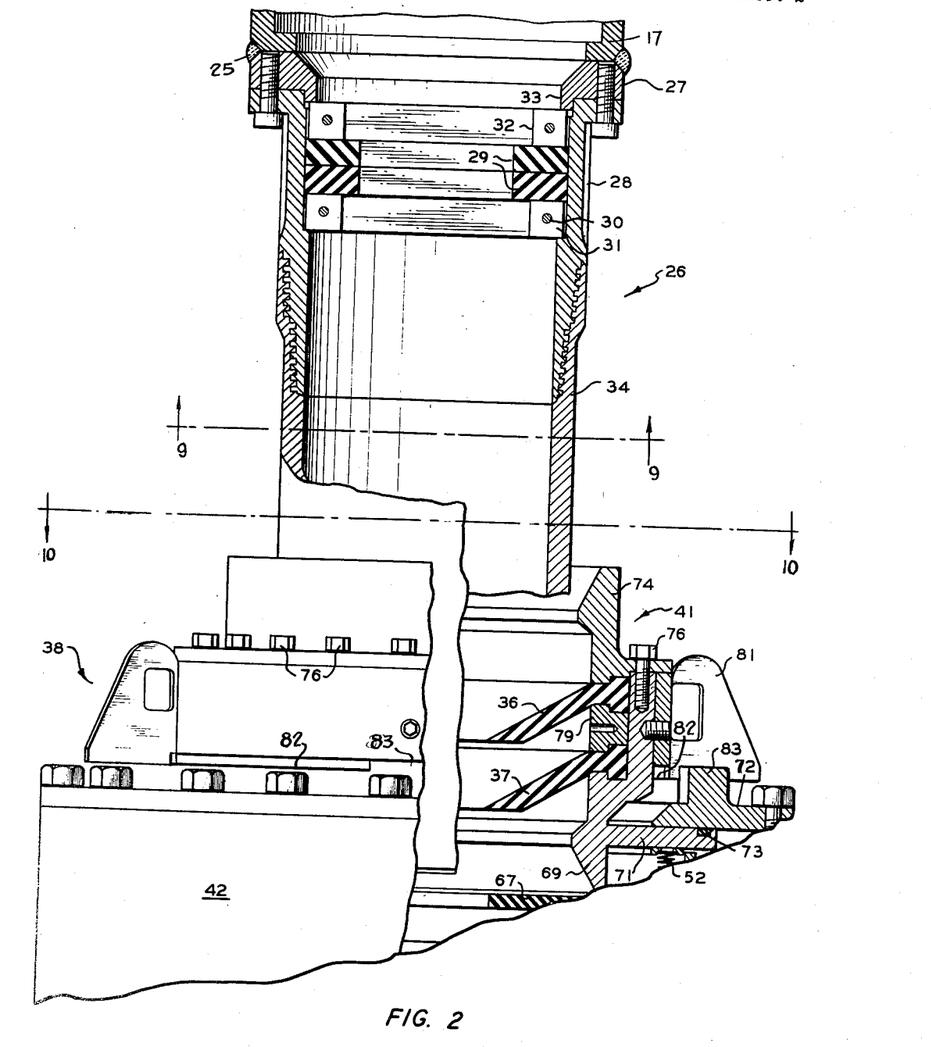
Figure 2 is an elevation, partially in cross section, illustrating one embodiment of the upper rotating sealing means of the invention, and a portion of the lower non-rotating sealing means of the invention.
Figure 5:
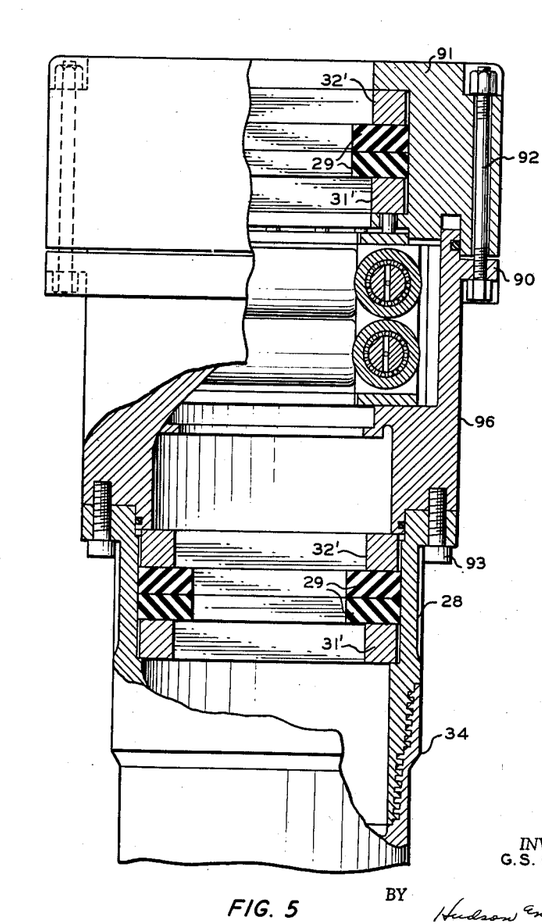
Figure 5 is a view, partially in cross section, of another embodiment of the upper rotating sealing means of the invention.

In the embodiment of the invention shown in Figure 2, the upper rotating sealing means designated generally as 26 comprises an adapter flange 27, and a packing gland 28. Adapter flange 27 is adapted to be connected to the bottom of skirt 17 of kelly drive bushing 18 as by welding 25 or other suitable means. Packing gland 28 is provided with kelly packing members 29 and kelly seal bushings 31 and 32 as shown. Kelly packing bushing 31 is supported by a ledge or shoulder provided in the inner wall of packing gland 28 as shown. Kelly packing bushing 32 is held in place by lip 33 of flange 27. Kelly packing bushings 31 and 32 are ring-like in structure and can be in two sections held together by dowel pins 30 as shown in Figure 2, or can be of one piece as shown in Figure 5. Said packing bushings are provided with openings therethrough adapted to fit the kelly employed, e.g., square, hexagonal, etc. Said kelly packing members 29 are adapted to form a sealed contact with the kelly when it is inserted through said packing gland. As there shown, said packing members are compressed as they would be when in sealed contact with a kelly. Said kelly packing members 29 are also adapted to fit the kelly employed and can be in one piece as shown or can be provided with an angle cut therethrough to facilitate installation.

Cylindrical sleeve 34 is connected to the lower end of packing gland 28 and can be of a variable length sufficient to extend through the resilient annular packing members 36 and 37 of upper body section 41 of the lower non-rotating seal 38. Said sleeve does not extend through the stripper seal members 66 and 67 (described further hereinafter) of the lower body section 42 of said lower non-rotating seal. If desired sleeve 34 and packing gland 28 can be integral. However, it is generally preferred that sleeve 34 be separate, as shown, to facilitate installation and utilization of different sleeve lengths with different rigs.

Figure 3:
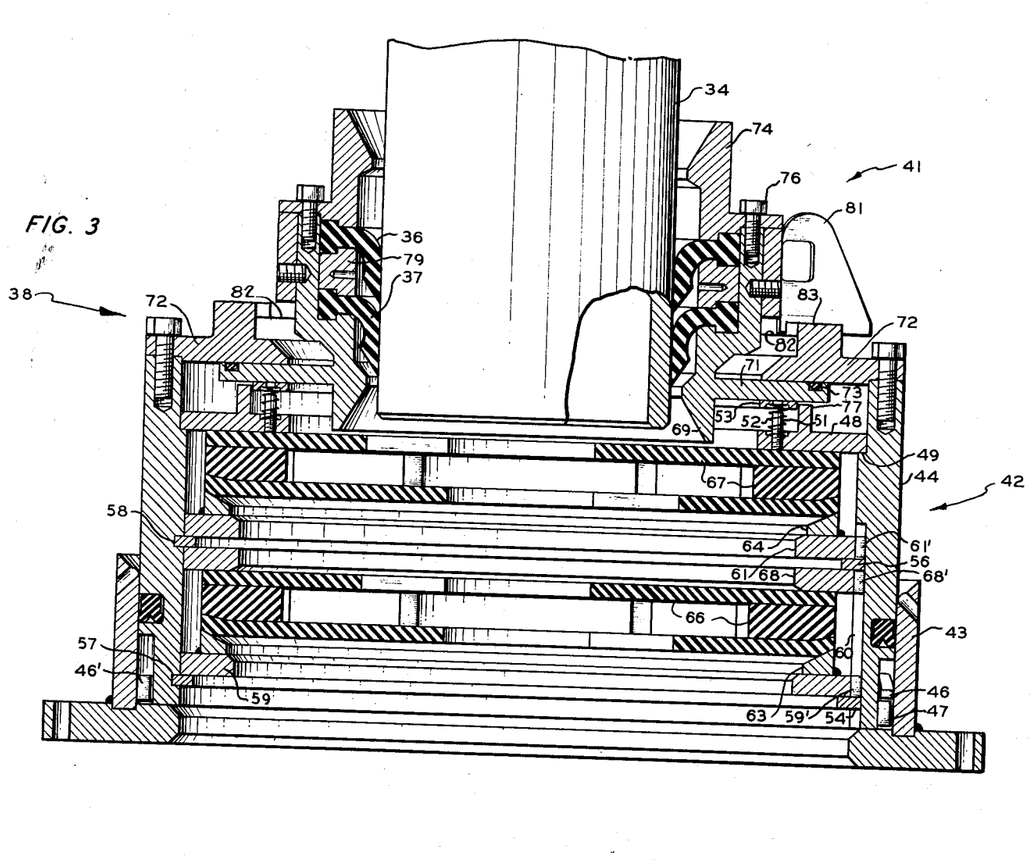
Figure 3 is an elevation in cross section, taken along line 3—3 of Figure 10, of the lower non-rotating sealing means of the invention and shows the relation thereto of the sleeve which extends between said lower non-rotating sealing means and said upper rotating sealing means.

Referring to Figure 3, the lower non-rotating sealing means 38 of the invention comprises an upper body section 41 and a lower body section 42. Said lower body section comprises a base 43, a cylindrical housing 44, and an annular cover plate 72. Said base 43 comprises a vertical cylindrical portion attached to a horizontal flange portion provided with bolt holes for mounting on a well head structure. Said housing 44 is adapted to fit within the cylindrical portion of said base 43. Said housing and said base are held together by a plurality of cooperating lugs 46 and 47. Lugs 46 are attached to the inner wall of base 43 and lugs 47 are formed in a recess in the outer wall of housing 44. Said lugs 46 and 47 are arranged so that housing 44 can be inserted in or removed from the cylindrical portion of base 43 by rotating said housing 44 about one quarter turn in a direction opposite to the direction of rotation of the kelly. The means for preventing rotation of said housing 44 in the direction of rotation of the kelly will be described hereinafter. An annular support plate 48 rests on a ledge or shoulder 49 provided in the inner wall of housing 44. A plurality of spring guide lugs 51 are mounted in and spaced around the inner periphery of said support plate 48 and serve as guides for springs 52 which are coiled around said lugs 51. Said springs 52 fit into corresponding recesses in support plate 48 and compression wear ring 53. Said springs thus form a resilient support for compression wear ring 53 and the upper body section 41 of the lower non-rotating sealing means.

Expanding lock rings 54 and 56 are positioned in grooves 57 and 58 respectively in the inner wall of housing 44. Said lock rings 54 and 56 support stripper seal retainer 59 and 61 respectively. Stripper seal bushings 63 and 64 are connected to and supported by said stripper seal retainers 59 and 61 respectively. Stripper seal members 66 and 67 rest in stripper seal bushings 63 and 64 respectively. Stripper seal member 66 is retained on its upper side by stripper seal retainer 68, and stripper seal member 67 is retained on its upper side by the lower side of support plate 48. Stripper seal retainers 59, 61, and 68 are provided with tabs 59', 61', and 68', respectively, in the outer peripheries, which tabs extend into keyway 60 and prevent rotation of said retainers. Compression prevents rotation of stripper seals 66 and 67. Said stripper seal members 66 and 67 can be made of any suitable resilient material, such as rubber and the various synthetic rubbers. Said stripper seal members are annular in shape and are provided with slits extending outwardly from the annulus therein as shown.

Figure 10:
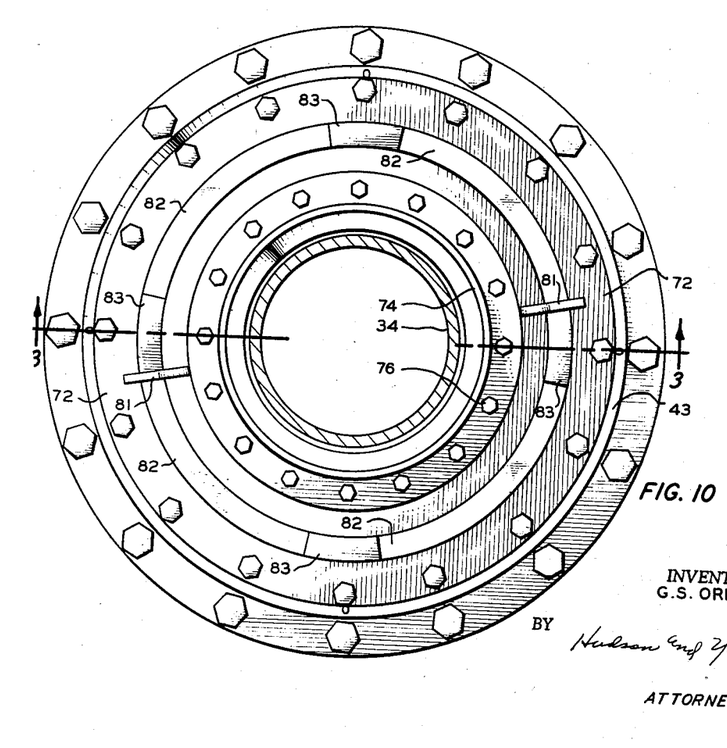
Figure 10 is a cross-section taken along the lines 10—10 of Figure 2 and shows in addition the base 43, not shown in Figure 2 but which is shown in Figure 3.

Said upper body section 41 of the lower non-rotating sealing means comprises a generally circular lower guide member 69 which is of smaller diameter than said housing 44 and which has a horizontal projection 71 extending outwardly from the lower portion thereof and slidably between said compression wear ring 53 and annular cover plate 72 which is connected to the top of and extends inwardly of said housing 44. An O-ring 73 provides a seal between said projection 71 and said cover plate 72. A generally circular upper guide member 74 of smaller diameter than said housing 44 is connected to lower guide member 69 by means of a plurality of bolts 76. Said lower guide member 69 and said upper guide member 74 are spaced apart at their inner circumference by annular packing members 36 and 37 which in turn are spaced apart by annular packing spacer 79. Upper body section lift member 81 is connected to said lower guide member 69 and rests slidably in slots 82 cut in boss 83 of cover plate 72. Said lift member 81, by resting in said slots 82, thus prevents the entire upper body section 41 of said lower sealing means 38 from rotating with the rotation of sleeve 34. The relation between lift members 81 and slot 82 in boss 83 is shown more clearly in Figure 10.

It will also be noted that said entire upper body section 41 is free to move a limited distance laterally so as to accommodate eccentricity and/or wobble of the kelly which would be transmitted to sleeve 34. However, the seal between said upper body section 41 and lower body section 42 is maintained by O-ring 73 which is maintained in contact with cover plate 72 by springs 52 and compression wear ring 53. Annular projection 77 extends upwardly from support plate 48 and serves as a stop member to prevent appreciable lateral movement of wear ring 53.

Figure 4:
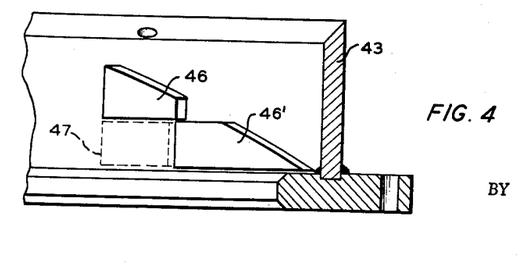
Figure 4 is a detailed view of a portion of the base of the lower non-rotating sealing means shown in Figure 3.

In Figure 4, there is illustrated the lug arrangement which prevents rotation of housing 44 with the kelly. Lugs 46 and 46' are attached to and positioned as shown on the inner wall of the cylindrical vertical portion of base 43. Said lugs 46 and 46' cooperate with lug 47 on housing 44 as follows: when housing 44 is inserted into base 43 it is rotated about one quarter turn clockwise so as to bring lug 47 into position behind lug 46' and below lug 46. Thus, since kelly 20 rotates in a clockwise direction, lug 47 will be placed into abutment with lug 46' and rotation of housing 44 is prevented. When it is desired to remove housing 44 from base 43, said housing 44 is rotated about one quarter turn in a counter-clockwise direction, thus removing lug 47 from beneath lug 46 and housing 44 can then be lifted from base 43. It will be understood that a plurality of lugs 46 and 46' are spaced around the inner wall of the base 43 and cooperate with a plurality of lugs 47 on housing 44 in the manner just described.

Figure 6:
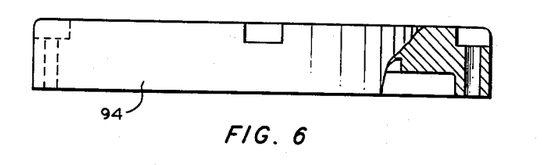
Figure 6 illustrates a bonnet which can be employed with the kelly drive bushing of Figure 5 in another embodiment of the upper rotating sealing means of the invention.
Figure 7:
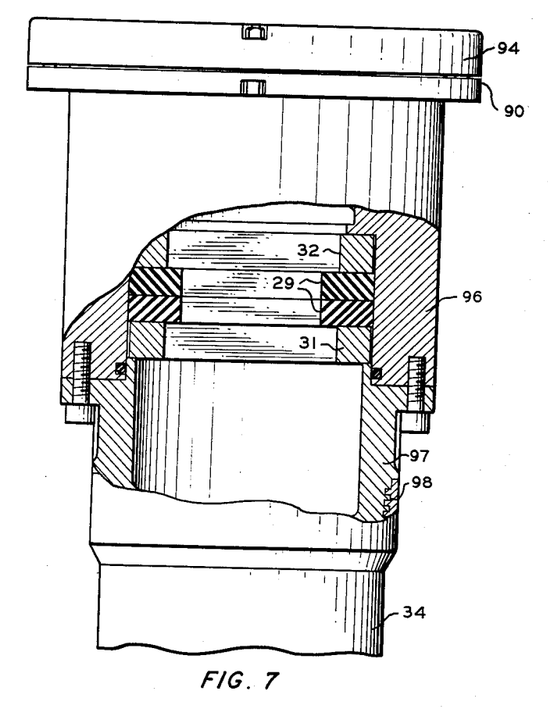
Figure 7 is an elevation, partially in cross section of still another embodiment of the upper rotating sealing means of the invention.

In the embodiment of the upper rotating seal illustrated in Figure 2, and shown installed in Figure 1, said rotating seal has been connected by welding 25 to the bottom of skirt 17 of rotary kelly bushing 18. In Figures 5, 6, and 7, there are illustrated other embodiments of the upper rotating seal of the invention which embodiments differ from that of Figure 2 primarily in the method of attachment to, and relative location of, said upper rotating seal with respect to the kelly drive bushing. In Figure 5, kelly drive bushing 90 is a modification of the kelly drive bushing illustrated in Figure 1. In said kelly drive bushing 90, means for packing the kelly has been provided in the top portion of said kelly drive bushing. Packing bushings 31' and 32', having packing members 29 therebetween, compress said packing members 29 when bonnet 91 is installed and tightened by means of bolts 92. As shown, said packing members 29 are in a compressed position in which they would engage the surface of kelly 20 if it were inserted.

The skirt 96 of kelly drive bushing 90 has also been modified to permit the attachment of packing gland 28 thereto by means of a plurality of bolts 93 spaced apart around said skirt. This modification eliminates adapter flange 27 and makes for a more convenient arrangement since it is not necessary to weld the bottom of said flange 27 to the skirt of the kelly packing bushing.

If desired, a kelly drive bushing having both an upper packing and a lower packing for the kelly, as shown in Figure 5, can be employed. However, the use of both packing glands is usually not necessary. The choice of whether to use an upper packing gland or a lower packing gland can be made in the field to suit the particular installation. In most instances, it will probably be more convenient to employ the modification wherein the kelly packing gland is provided in the top of the kelly drive bushing since it is thus easily accessible from the rig floor. However, if desired, bonnet 91 can be replaced with bonnet 94 shown in Figure 6, and only the lower packing gland connected to the skirt 96 of the rotary kelly bushing employed.

Still another modification is shown in Figure 7 wherein the skirt 96 has been modified to include the kelly packing within said skirt. In this modification, packing follower 97 serves to compress the packing members 29 in the same manner as previously described, and also provides threads 98 as a means for connecting cylindrical sleeve 34. In this modification, a bonnet 94 has been shown as employed in connection with kelly drive bushing 90 and the packing in the upper portion of said kelly drive bushing has been eliminated. It will be realized by those skilled in the art that the various modifications shown in Figures 5, 6, and 7 can be employed in different combinations to provide one or two packing glands for the kelly, i.e., above and/or below the rotary kelly bushing. For example, the upper packing shown in Figure 5 can be employed with the kelly drive bushing shown in Figure 7 to provide a kelly drive bushing provided with both upper and lower packing within said bushing.

In operation, when it is desired to install my improved rotary seal, the horizontal portion of base 43 is connected to the upper end of mud return line 13 as shown in Figure 1. The remainder of the lower non-rotating sealing means comprising lower body section 42 and upper body section 41 is then assembled and lowered through rotary table 22, and driving mechanism 21, master bushing 19 having been removed. Housing 44 can be locked into base 43 as previously described. Upper rotating seal means 26 is then assembled. The details of assembly of said upper rotating sealing means 26 will depend upon the particular modification employed and will be evident to those skilled in the art in view of the previous description. In the modification illustrated in Figures 1 and 2, kelly drive bushing 18, having flange 27 attached to the skirt 17 thereof, is assembled on kelly 20 in the usual manner. Kelly packing gland 28 is then assembled and bolted to flange 27 sufficiently tight to compress packing members 29 into sealing contact with the kelly. Cylindrical sleeve 34 is then attached to the bottom of flange 27. As the kelly is lowered into the hole cylindrical sleeve 34 is guided by top guide 74 through packing members 36 and 37 which form a seal therewith. Thus, as the drilling proceeds, upper seal 26 rotates with the kelly drive bushing and provides a seal by means of packing members 36 and 37 on the outside of cylindrical sleeve 34, and kelly packing members 29 on the inside, so as to force the returning drilling mud to pass out through outlet 14 to the separator and shale shaker (not shown).

Figure 8:
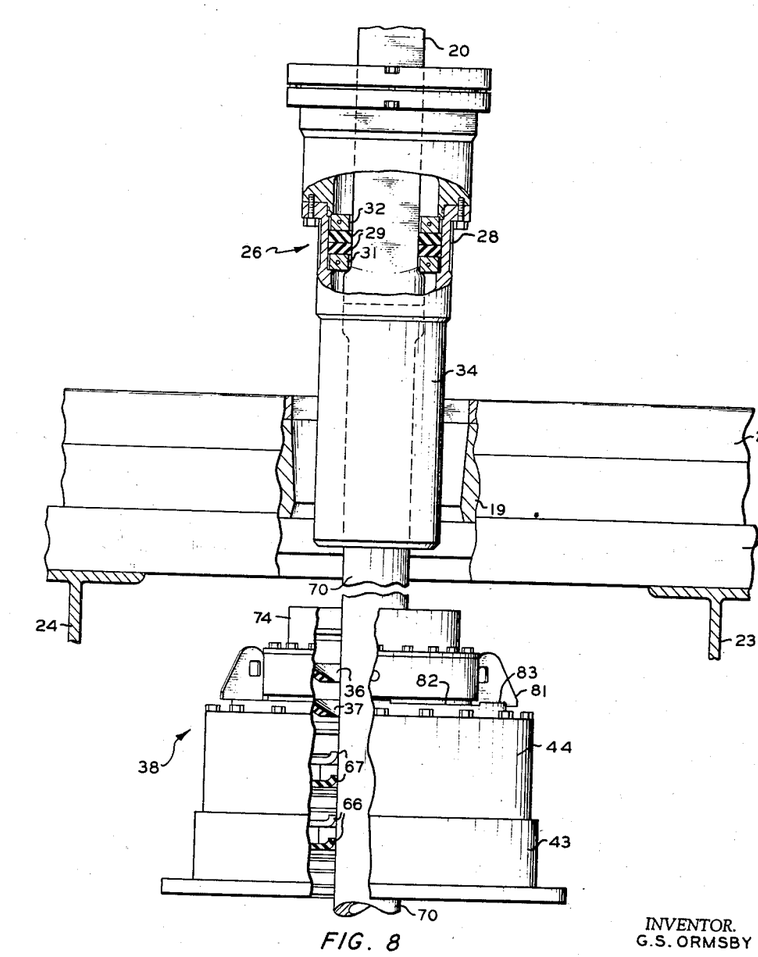
Figure 8 is an elevation, partially in cross-section, illustrating the relation between the sealing means of the invention and the drill stem when said drill stem has been raised preparatory to installing another length of drill pipe.
Figure 9:
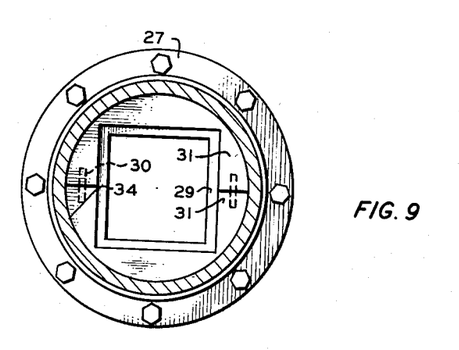
Figure 9 is a cross-section taken along the lines 9—9 of Figure 2.

When it is desired or necessary to make a connection and insert another length of drill pipe, kelly 20 is lifted in the usual manner thus removing sleeve 34 from contact with packing members 36 and 37 as best shown in Figure 8. During this time, the stripper packing members 66 and 67 in housing 44 of the lower non-rotating sealing means restrict flow of drilling fluid by packing off the space betweeen the drill pipe 70, which has been lifted up into engagement with said stripper packers 66 and 67, as shown in Figure 8, and the body of the lower non-rotating seal. Said stripper packers 66 and 67 will furnish sufficient packing at this stage of the operation because the pressure at this time is very low. The new length of drill pipe is then connected into the string in the regular manner, the string is lowered bringing sleeve 34 into contact with packing members 36 and 37, and drilling is resumed. Said stripper packers 66 and 67 also possess an advantage in that when the drill pipe is removed from the hole, they serve to swab the outside of said drill pipe and thus make for cleaner operations on the derrick floor.

The rotary seal of the invention provides several advantages over the rotary seals of the prior art. One of the most important of these advantages is that my improved rotary seal practically eliminates stress and strain on the supporting casing. The lower non-rotating sealing means comprising upper body section 41 and lower body section 42 is designed and will tolerate more side play than ordinarily exists in a drill string due to eccentricity of rotation, wobble of the kelly, and misalignment of the derrick and/or supporting casing. The feature of the non-rotating lower sealing means which contributes to this feature of the invention is the sliding seal between the projection 71 of lower guide member 69 and cover plate 72. In addition to this completely novel feature, my rotary seal weighs only about 1/10 to 1/12 as much as available rotary seals, thus reducing any inertia effect which can possibly be transmitted to the supporting casing. The ratio of the weight of my rotating seal to the weight of the free length (above ground) of the supporting casing prevents any resonant whipping frequencies being set up in the system due to rotation of the rotating seal.

The entire lower non-rotating sealing means of my rotary seal (mounted on the mud return riser) is small enough in outer diameter, and in height (less than ½ that of any rotary seal previously available) that it can be mounted between the rotary beams, and even extending up into the average rotary table a short disance if necessary. Due to this feature, no extra substructure height (which is always at a premium), is required for my rotary seal. Previously available rotary seals are so long that it is necessary on most rigs to dig a "cellar" and mount much of the casing hanging equipment below ground level in order to accommodate the rotary seal. This lowers the T connection of the mud return riser and the horizontal mud return flow line to the extent that it is usually found necessary to excavate and partially bury the mud tanks in the ground to prevent the mud return line from running in an uphill direction. These alterations, necessary with previous rotary seals, are expensive, time consuming, and result in permanent wellhead equipment being set below ground level, thus increasing the maintenance cost of same during the producing life of the well after drilling is completed.

My improved rotary seal is the first available rotary seal which permits surface hole to be drilled as conveniently as the intermediate or the production hole. By the common operation of removing the master bushings from the rotary table momentarily, housing 44 and the remainder of the lower non-rotating sealing means, except base 43 can be pulled through the rotary table. Base 43 will then allow the maximum size bits ordinarily used for surfaces holes to pass therethrough.

The drill string, except for the larger connections, can be pulled through the lower non-rotating sealing means of my rotary seal without damage. Packing members 36 and 37 are protected from tool joint damage by the design of the inward projections and recesses of top and lower center guide pieces 69 and 74. While said packing members 36 and 37 are not effective during this operation, the stripper seal members 66 and 67 restrict the upward flow of annular fluids, protecting the floor crew and permitting normal operations to continue while the drill hole annulus bleeds down. This feature is time-saving, as well as increasing the safety of the rig personnel.

My improved rotary seal eliminated the need for various sized heads for low-pressure drilling, since it meets all requirements for low-pressure drilling in all hole programs in common use.

My improved rotary seal effects a positive seal at any pressure between atmospheric and about 40 p.s.i. Presently available rotary seals are designed to withstand pressures in excess of 1000 p.s.i. and usually do not reach maximum sealing effectiveness at pressures below 100 p.s.i. During air drilling, gas drilling, and aerated mud drilling, pressures at the rotating head seldom exceed 5 p.s.i. In my rotary seal the springs 52 transmit an upward force through compression ring 53 to projection 71 containing O-ring 73, maintaining closure between said O-ring 73 and cover plate 72, even under pressure conditions as low as atmospheric inside the housing.

My rotary seal is designed to operate with minimum of maintenance. All parts are designed to operate without lubrication other than that afforded by well fluids during operation and these are not essential to its operation. One man can completely dismantle the entire assemble in a matter of minutes for replacement of any and all parts. Furthermore, the design is such that all parts can be made interchangeable without hand fitting.

As will be evident to those skilled in the art, in view of the above disclosure, various modifications can be made without departing from the spirit or scope of the invention.

I claim:

1. In rotary well drilling apparatus, an improved rotary seal comprising, in combination: an upper rotatable sealing means adapted to form a sealed contact with a kelly; a lower non-rotatable sealing means comprising, a generally tubular body structure having a lower body section adapted to be connected to a well casing head structure, and an upper body section provided with sealing means in sealed laterally movable contact with said lower body section but free to move laterally relative to said lower body section; and a sleeve attached to said upper sealing means and extending between said upper rotatable sealing means and said lower non-rotatable sealing means.

2. In rotary well drilling apparatus, an improved rotary seal comprising, in combination: an upper rotatable sealing means adapted to form a sealed contact with a kelly; a lower non-rotatable sealing means comprising, a generally tubular body structure having a lower body section adapted to be connected to a well casing head structure, an upper body section provided with sealing means in sealed laterally movable contact with said lower body section but free for sealed lateral movement relative to said lower body section, and annular resilient packing means extending inwardly from the inner wall of said upper body section; and a sleeve attached to and extending from said upper sealing means into said upper body section in sealing contact with said annular resilient packing means therein.

3. In rotary well drilling apparatus, an improved rotary seal comprising, in combination: an upper rotatable sealing means comprising, a kelly drive bushing for driving a kelly, a kelly packing within said bushing, and means for compressing said packing into sealing contact with said kelly; a lower non-rotatable sealing means comprising, a generally tubular body structure having a lower body section adapted to be connected to a well casing head structure, an upper body section provided with sealing means in sealed laterally movable contact with said lower body section but free for sealed lateral movement relative to said lower body section, and annular resilient packing means extending inwardly from the inner wall of said upper body section; and a sleeve attached to and extending from said kelly drive bushing into said upper body section in sealing contact with said annular resilient packing means therein.

4. The improved rotary seal of claim 3 wherein said kelly packing is positioned in the top portion of said kelly drive bushing.

5. The improved rotary seal of claim 3 wherein said kelly packing is positioned in the bottom portion of said kelly drive bushing.

6. The improved rotary seal of claim 3 wherein a first kelly packing is positioned in the top portion of said kelly drive bushing and a second kelly packing is positioned in the bottom position of said kelly drive bushing.

7. In rotary well drilling apparatus, an improved rotary seal comprising, in combination: an upper rotatable sealing means comprising, a kelly packing gland adapted to be attached to a kelly drive bushing surrounding a kelly, a packing within said packing gland, and means for compressing said packing into sealing contact with said kelly; a lower non-rotatable sealing means comprising a generally tubular body structure having an upper body section in sealed laterally movable contact with a lower body section adapted to be connected to a well casing head structure, said upper body section being of smaller cross-sectional area and extending into said lower body section with freedom for sealed lateral movement relative to said lower body section, and annular resilient packing means extending inwardly from the inner wall of said upper body section; and a sleeve attached to and extending from said upper sealing means into said upper body section in sealing contact with said annular resilient packing means therein.

8. In rotary well drilling apparatus, an improved rotary seal comprising, in combination: an upper rotatable sealing means comprising, a kelly packing gland adapted to be attached to the top of a kelly drive bushing surrounding a kelly, a packing within said packing gland, and means for compressing said packing into sealing contact with said kelly; a lower non-rotatable sealing means comprising a generally tubular body structure having an upper body section in sealed laterally movable contact with a lower body section adapted to be connected to a well casing head structure, said upper body section being of smaller cross-sectional area and extending into said lower body section with freedom for sealed lateral movement relative to said lower body section, and annular resilient packing means extending inwardly from the inner wall of said upper body section; and a sleeve attached to and extending from the bottom of said kelly drive bushing into said upper body section in sealing contact with said annular resilient packing means therein.

9. In rotary well drilling apparatus, an improved rotary seal comprising, in combination: an upper rotatable sealing means comprising, a kelly packing gland adapted to be attached to the bottom of a kelly drive bushing surrounding a kelly, a packing within said packing gland, and means for compressing said packing into sealing contact with said kelly; a lower non-rotatable sealing means comprising, a generally tubular body structure having an upper body section in sealed laterally movable contact with a lower body section adapted to be connected to a well casing head structure, said upper body section being of smaller cross-sectional area and extending into said lower body section with freedom for sealed lateral movement relative to said lower body section, and resilient annular packing means extending inwardly from the inner wall of said upper body section; and a sleeve attached to and extending from the bottom of said kelly packing gland into said upper body section in sealing contact with said annular resilient packing means therein.

10. In rotary well drilling apparatus, an improved rotary seal comprising, in combination: an upper rotatable sealing means comprising a cylindrical sleeve attached to and extending downwardly from a kelly drive bushing surrounding a kelly, a packing supported in the upper portion of said sleeve, and means for compressing said packing into sealing contact with said kelly; and a lower non-rotatable sealing means comprising, a generally tubular body structure having an upper body section in sealed laterally movable contact with a lower body section adapted to be connected to a well casing head structure, said upper body section being of smaller cross-sectional area and extending into said lower body section with freedom for sealed lateral movement relative to said lower body section; and annular resilient packing means extending inwardly from the inner wall of said upper body section and adapted to form a sealing contact with the lower portion of said sleeve when said sleeve is inserted into said upper body section.

11. The rotary seal combination of claim 4 wherein said lower body section comprises: a cylindrical base adapted to be connected to a well casing head structure; a cylindrical housing adapted to fit within said base; means for holding said housing within said base; an annular support plate supported within said housing; a plurality of spring members extending upwardly from and positioned at spaced intervals around the inner peripheral portion of said support plate; an annular compression wear ring resting upon said spring members; and an annular cover plate attached to the top of and extending inwardly of said housing; and wherein said upper body section comprises: a generally circular lower guide member of smaller diameter than said housing and having a horizontal projection extending outwardly from the lower portion thereof and slidably between said compression wear ring and said cover plate; an O-ring positioned in a groove in said projection and adapted to form a seal between said projection and said cover plate; a generally circular upper guide member of smaller diameter than said housing and connected to said lower guide member; a plurality of spaced-apart, annular packing members positioned between and extending inwardly from said guide members; means for spacing said packing members apart, the inner wall of said last mentioned means together with the inner walls of said guide members forming said inner wall of said upper body section; and means for preventing rotation of said upper body section relative to said lower body section.

12. The rotary seal combination of claim 11 wherein annular resilient stripper seal means, and means for supporting same, are provided within said housing.

13. The rotary seal combination of claim 12 wherein said stripper seal means, and means for supporting same, comprises: a first expandible lock ring positioned in and extending inwardly from a first groove in the inner wall of said housing; a first annular stripper seal retainer resting on said first lock ring and having a tab on the outer periphery thereof extending into a keyway in the inner wall of said housing; a first annular stripper seal bushing attached to and supported by said first stripper seal retainer; an annular resilient first stripper seal resting on said first stripper seal bushing; a second annular stripper seal retainer positioned above and adjacent to said first stripper seal and having a tab on the outer periphery thereof extending into said keyway; a second expandible lock ring positioned in and extending outwardly from a second groove in the inner wall of said housing immediately above said second stripper seal retainer; a third annular stripper seal retainer resting on said second lock ring and having a tab on the outer periphery thereof extending into said keyway; a second stripper seal bushing attached to and supported by said third stripper seal retainer; and a second annular resilient stripper seal resting on said second stripper seal bushing.

14. The rotary seal combination of claim 11 wherein said base comprises: a horizontal flange member adapted to be connected to a well casing head; and a vertical cylindrical member attached to said horizontal member; and said means for holding said housing within said base comprises: a plurality of first lugs extending inwardly at spaced intervals from the inner wall of said vertical cylindrical member of said base; and a plurality of second lugs extending outwardly from spaced intervals from the outer surface of said housing, said first and said second lugs being arranged and adapted to coact with each other to hold said housing and said base together, to prevent rotation of said housing within said base during operation and to permit insertion and removal of said housing from said base upon rotation of said housing in a direction opposite to the direction of rotation of said kelly.

15. The rotary seal combination of claim 5 wherein said lower body section comprises: a cylindrical base adapted to be connected to a well casing head structure; a cylindrical housing adapted to fit within said base; means for holding said housing within said base; an annular support plate supported within said housing; a plurality of spring members extending upwardly from and positioned at spaced intervals around the inner peripheral portion of said support plate; an annular compression wear ring resting upon said spring members; and an annular cover plate attached to the top of and extending inwardly of said housing; and wherein said upper body section comprises: a generally circular lower guide member of smaller diameter than said housing and having a horizontal projection extending outwardly from the lower portion thereof and slidably between said compression wear ring and said cover plate; an O-ring positioned in a groove in said projection and adapted to form a seal between said projection and said cover plate; a generally circular upper guide member of smaller diameter than said housing and connected to said lower guide member; a plurality of spaced-apart, annular packing members positioned between and extending inwardly from said guide members; means for spacing said packing members apart, the inner wall of said last mentioned means together with the inner walls of said guide members forming said inner wall of said upper body section; and means for preventing rotation of said upper body section relative to said lower body section.

16. The rotary seal combination of claim 15 wherein annular resilient stripper seal means, and means for supporting same, are provided within said housing.

17. The rotary seal combination of claim 16 wherein said stripper seal means, and means for supporting same, comprises: a first expandible lock ring positioned in and extending inwardly from a first groove in the inner wall of said housing; a first annular stripper seal retainer resting on said first lock ring and having a tab on the outer periphery thereof extending into a keyway in the inner wall of said housing; a first annular stripper seal bushing attached to and supported by said first stripper seal retainer; an annular resilient first stripper seal resting on said first stripper seal bushing; a second annular stripper seal retainer positioned above and adjacent to said first stripper seal and having a tab on the outer periphery thereof extending into said keyway; a second expandible lock ring positioned in and extending outwardly from a second groove in the inner wall of said housing immediately above said second stripper seal retainer; a third annular stripper seal retainer resting on said second lock ring and having a tab on the outer periphery thereof extending into said keyway; a second stripper seal bushing attached to and supported by said third stripper seal retainer; and a second annular resilient stripper seal resting on said second stripper seal bushing.

18. The rotary seal combination of claim 15 wherein said base comprises: a horizontal flange member adapted to be connected to a well casing head; and a vertical cylindrical member attached to said horizontal member; and said means for holding said housing within said base comprises: a plurality of first lugs extending inwardly at spaced intervals from the inner wall of said vertical cylindrical member of said base; and a plurality of second lugs extending outwardly from spaced intervals from the outer surface of said housing, said first and said second lugs being arranged and adapted to coact with each other to hold said housing and said base together to prevent rotation of said housing within said base during operation and to permit insertion and removal of said housing from said base upon rotation of said housing in a direction opposite to the direction of rotation of said kelly.

19. In a rotary well drilling apparatus, an improved rotary seal comprising, in combination: an upper rotatable sealing means adapted to form a sealed contact with a kelly; a lower non-rotatable sealing means comprising, a generally tubular body structure having a lower body section adapted to be connected to a well casing head structure, and an upper body section in sealed laterally movable contact with said lower body section but free to move laterally relative to said lower body section; and a sleeve attached to said upper sealing means and extending between said upper rotatable sealing means and said lower non-rotatable sealing means; said lower body section of said lower non-rotatable sealing means comprising: a cylindrical housing having a base adapted to be connected to a well casing head structure; an annular support plate supported within said housing; a plurality of spring members extending upwardly from and positioned at spaced intervals around the inner peripheral portion of said support plate; an annular compression wear ring resting upon said spring members; and an annular cover plate attached to the top of and extending inwardly of said housing; and said upper body section of said lower non-rotatable sealing means comprising: a generally circular guide member of smaller diameter than said housing, extending into said housing, and having a horizontal projection extending outwardly from the lower portion thereof and slidably between said compression wear ring and said cover plate of said lower body section; packing means between said projection and said cover plate for forming a seal therebetween but leaving said guide member free for lateral movement relative to said housing; at least one annular packing member extending inwardly from the inner wall of said guide member; and means for preventing rotation of said thus-formed upper body section relative to said lower body section.

20. In rotary well drilling apparatus, an improved rotary seal comprising, in combination: an upper rotatable sealing means adapted to form a sealed contact with a kelly; a lower non-rotatable sealing means comprising, a generally tubular body structure having a lower body section adapted to be connected to a well casing head structure, and an upper body section provided with sealing means on the lower portion thereof which extends into the upper portion of said lower body section to form a laterally movable contact seal between said sections leaving said upper body section free for sealed lateral movement relative to said lower body section; and a sleeve attached to said upper rotatable sealing means and extending between said upper rotatable sealing means and said lower non-rotatable sealing means.

21. In rotary well drilling apparatus, an improved rotary seal comprising, in combination: an upper rotatable sealing means adapted to form a sealed contact with a kelly; a lower non-rotatable sealing means comprising, a generally tubular body structure having a lower body section adapted to be connected to a well casing head structure, and upper body section provided with sealing means on the lower portion thereof which extends into the upper portion of said lower body section to form a laterally movable contact seal between said sections leaving said upper body section free for sealed lateral movement relative to said lower body section, and annular resilient packing means extending inwardly from the inner wall of said upper body sections; and a sleeve attached to and extending from said upper rotatable sealing means into said upper body section in sealing contact with said annular resilient packing means therein.

22. In rotary well drilling apparatus, an improved rotary seal comprising, in combination: an upper rotatable sealing means comprising, a kelly drive bushing for driving a kelly, a kelly packing within said bushing, and means for compressing said packing into sealing contact with said kelly; a lower non-rotatable sealing means comprising, a generally tubular body structure having a lower body section adapted to be connected to a well casing head structure, an upper body section provided with sealing means on the lower portion thereof which extends into the upper portion of said lower body section to form a laterally movable contact seal between said sections leaving said upper body section free for sealed lateral movement relative to said lower body section, and annular resilient packing means extending inwardly from the inner wall of said upper body section; and a sleeve attached to and extending from said kelly drive bushing into said upper body section in sealing contact with said annular resilient packing means therein.

References Cited in the file of this patent

UNITED STATES PATENTS

| | | |
|---|---|---|
| 1,628,363 | Harris et al. | May 10, 1927 |
| 1,831,956 | Harrington | Nov. 17, 1931 |
| 2,144,682 | MacClutchie | Jan. 24, 1939 |
| 2,222,082 | Leman et al. | Nov. 19, 1940 |
| 2,338,093 | Caldwell | Jan. 4, 1944 |

FOREIGN PATENTS

| | | |
|---|---|---|
| 686,169 | Germany | Jan. 4, 1940 |